H. E. MOEBUS.
TIRE.
APPLICATION FILED SEPT. 1, 1909.

979,325.

Patented Dec. 20, 1910.
3 SHEETS—SHEET 1.

Witnesses:
Nathan C. Lombard
Edna C. Cleveland

Inventor:
Henry E. Moebus:
by Walter E. Lombard,
Atty.

H. E. MOEBUS.
TIRE.
APPLICATION FILED SEPT. 1, 1909.

979,325.

Patented Dec. 20, 1910.

3 SHEETS—SHEET 2.

Witnesses:
Nathan C. Lombard
Edna C. Cleveland

Inventor:
Henry E. Moebus,
by Walter E. Lombard,
Atty.

H. E. MOEBUS.
TIRE.
APPLICATION FILED SEPT. 1, 1909.

979,325.

Patented Dec. 20, 1910.

3 SHEETS—SHEET 3.

Witnesses:
Nathan C. Lombard
Edw. C. Cleveland

Inventor:
Henry E. Moebus,
by Walter E. Lombard,
Atty.

UNITED STATES PATENT OFFICE.

HENRY EDWARD MOEBUS, OF BOSTON, MASSACHUSETTS, ASSIGNOR TO HOWARD W. BROWN, TRUSTEE, OF BROOKLINE, MASSACHUSETTS.

TIRE.

979,325.  Specification of Letters Patent.  Patented Dec. 20, 1910.

Application filed September 1, 1909. Serial No. 515,720.

*To all whom it may concern:*

Be it known that I, HENRY E. MOEBUS, a citizen of the United States of America, and a resident of Boston, in the county of Suffolk and State of Massachusetts, have invented certain new and useful Improvements in Tires, of which the following is a specification.

This invention relates to vehicle tires and has for its object the production of a tire which may be applied to any wheel and will have considerable resiliency while at the same time it is incapable of becoming punctured in its travel over the road.

The invention consists of a two-part tire composed of two U-shaped annular members one of which fits over the other and forms a chamber adapted to receive compressed air which normally retains the two members separated, said U-shaped members being also connected by suitable flexible sheets or other members which not only assist in keeping the two parts separated but also insure the simultaneous rotation of the two members.

The invention further consists in certain novel features of construction and arrangement of parts which will be readily understood by reference to the description of the drawings and to the claims hereinafter given.

Figure 1:
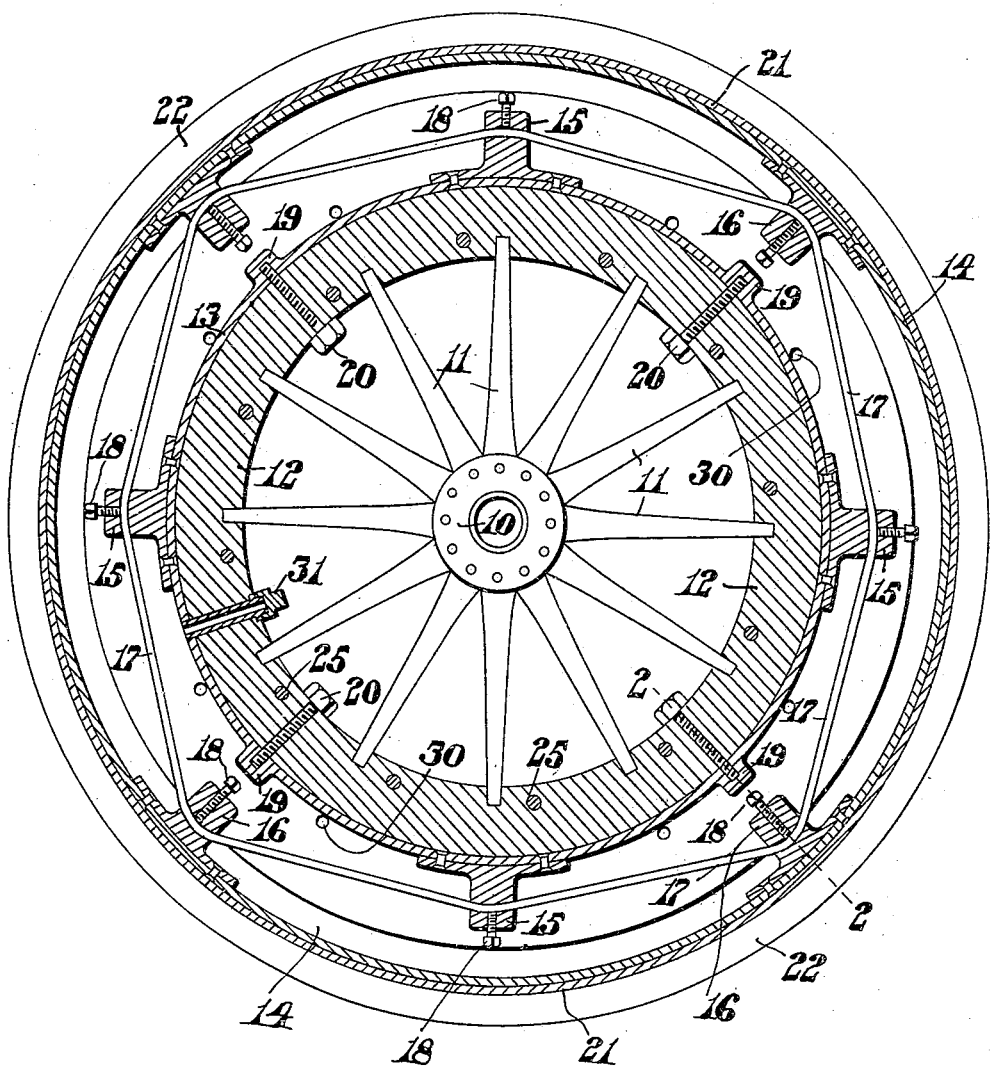
Figure 2:
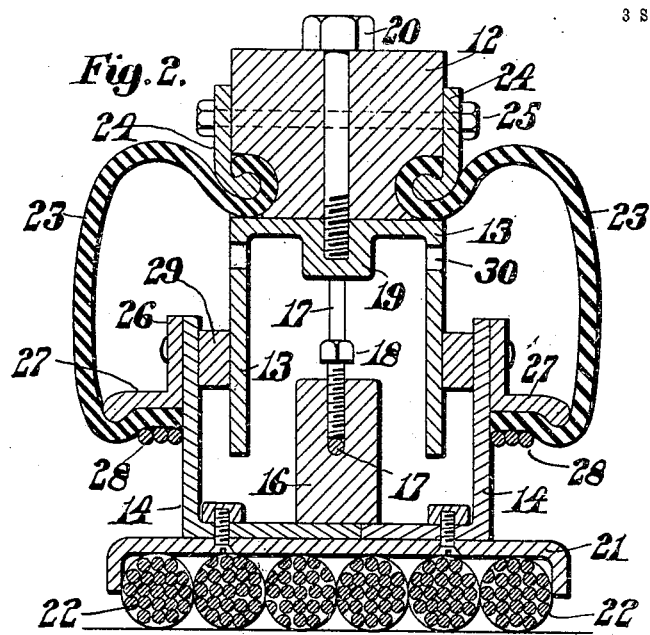
Figure 3:
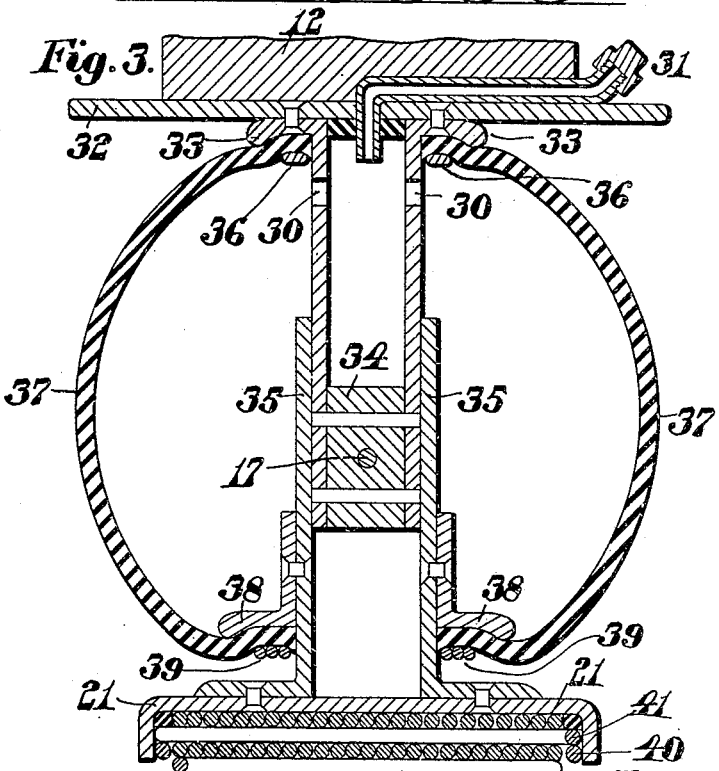
Figure 4:
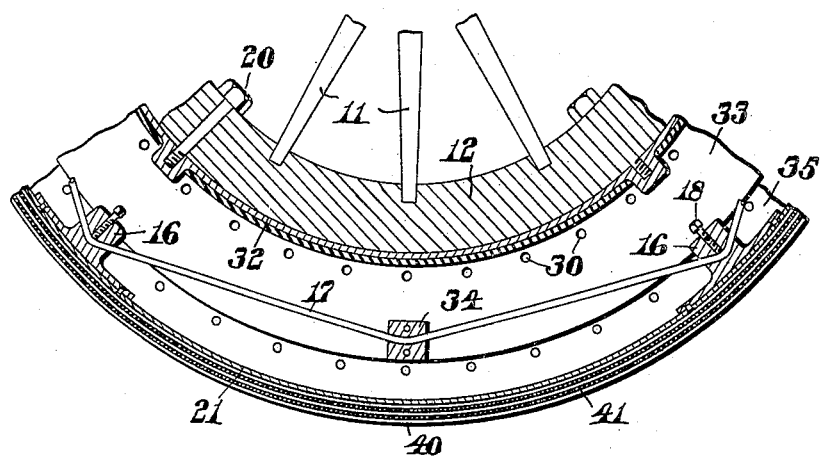

Of the drawings: Figure 1 represents a vertical section of the vehicle wheel showing a tire applied thereto embodying the features of the present invention. Fig. 2 represents a section on line 2—2 on Fig. 1, drawn to a greatly enlarged scale. Fig. 3 represents a similar enlarged section through a portion of the felly and showing a modified form of tire secured thereto, and Fig. 4 represents a vertical section of a portion of a vehicle wheel showing applied thereto the form of tire shown in Fig. 3.

Similar characters designate like parts throughout the drawings.

In the drawings, 10 represents the hub of a wheel provided with the radiating spokes 11 to the outer end of which is secured the usual felly 12. On the outer periphery of the felly 12 is mounted a U-shaped member 13 over which is fitted a similar U-shaped member 14. To the interior of the U-shaped members 13 and 14 are secured the projecting members 15 and 16 having openings extending therethrough through which extends a cable 17, said cable being prevented from slipping in the openings through the projections 15 and 16 by any suitable means, as, for instance, the set screws 18. This cable 17 secured in the manner set forth to the projections 15 and 16 on the annular U-shaped members 13 and 14 insures the simultaneous rotation of these two U-shaped members 13 and 14 during the rotation of the vehicle wheel. The annular member 13 is provided with bosses 19 secured to or formed upon said ring to which is threaded the ends of the bolts 20 passing through the felly 12. In a similar manner a lipped ring 21 is secured to the outer faces of the U-shaped member 14. Between the lips of this member 21 is wound a cable 22, the outer face of which extends beyond the lips upon the annular member 21. This cable is secured in position upon the lipped ring 21 in any well-known manner and provides an excellent tread surface for the wheel which impinges firmly upon the ground over which the car passes and owing to its uneven surface is a sure preventative for skidding.

In depressions in the outer side walls of the felly 12 are inserted the inner edges of the annular rubber sheets 23 which edges are held in position by means of the ribbed plate 24 secured to the side walls of said felly 12 by means of bolts 25 extending through the same. The side wall of the outer U-shaped ring 14 has secured to its outer faces the rings 26 over the lips 27 of which the outer edges of the rubber sheets 23 are held in position by means of a plurality of rings 28 wound thereon or otherwise secured thereto.

Between the side walls of the U-shaped members 13 and 14 are the filling rings 29 welded or otherwise secured to the side walls of the U-shaped member 14 and having a sliding fit against the outer face of the side walls of the U-shaped member 13. These side walls of the U-shaped member 13 are provided with passages 30 so that the air contained within the chamber formed by means of the annular U-shaped members 13 and 14 may freely pass into the chambers formed by the flexible rubber sheets 23 interposed between the felly 12 and the outer U- shaped member 14. Compressed air is forced into this chamber through the valve 31, this compressed air retained within this chamber normally retaining the various members in concentric position, as indicated in Fig. 1.

In some cases it is preferred to secure to the felly 12 a ring 32 to which two flanged plates 33 are permanently secured, these plates being separated at their outer ends by means of a plurality of filling members 34. The outer faces of these plates 33 bear against the inner walls of the annular flanged plate 35 secured to the lipped plate 21. It is obvious that these plates under undue strain will slide along the surface of the plates 33 and the compressed air contained within the chamber formed thereby will return the various parts to their normal position when the abnormal strain is removed therefrom.

Held in position by means of the ring 36 on either side of these sheets 33 are annular rubber plates or rings 37, the outer edges of which are held against the flanged members 38 secured to the outer walls of the members 35 by means of a plurality of wires or other retaining members 39.

Instead of winding a cable around the member 21 between its lips to form a tread surface a woven belt of wire or similar material may be secured in position between these lips upon the outer face of the ring 21 as indicated in Fig. 3, this being held in position by means of the rings 40 bearing against an interwoven cross member or wire 41 extending beyond the edge of said woven belt.

This makes a very effective tire for vehicle wheels which has all the advantages of the usual pneumatic tire and overcomes many of the objections thereto as it provides a metallic tread surface which will be an absolute preventative for skidding and is puncture-proof while interposed between the felly and this tread surface are the U-shaped members fitting into and movable relative to each other and connected together by a flexible member forming a chamber capable of retaining compressed air which will yield under abnormal conditions to give the proper degree of resiliency to the tire.

It is believed the operation and many advantages of the invention will be readily understood from the foregoing description.

Having thus described my invention, I claim:

1. In combination with a wheel, a tire formed in two parts movable relative to each other, one of said parts being secured to the felly of the wheel; flexible annular sheets hermetically clamped at one edge to the movable part of said tire and at the other edge to a fixed part of the wheel; means for forcing compressed air into the space between said two parts; and means secured to both of said parts for causing them to rotate in unison.

2. In combination with a wheel, a tire formed in two parts movable relative to each other, one of said parts being secured to the felly of the wheel; flexible annular sheets hermetically clamped at one edge to the movable part of said tire and at the other edge to a fixed part of the wheel; means for forcing compressed air into the space between said two parts; and a flexible member secured to both of said parts for causing them to rotate in unison.

3. In combination with a wheel, a U-shaped annular member secured to the felly thereof; a similar U-shaped annular member fitting over the same; flexible connecting sheets forming annular pockets communicating with the space between said members; and means for forcing compressed air into the space between the two U-shaped members.

4. In combination with a wheel, a U-shaped annular member secured to the felly thereof; a similar U-shaped annular member fitting over the same; flexible annular sheets clamped at their outer edges to the outer of said annular members and at their inner edges to a fixed part of said wheel; lipped flanges projecting from one of said members; and a plurality of members wound over the edges of said sheets to retain them in position upon said lipped flanges.

5. In combination with a wheel, a U-shaped annular member secured to the felly thereof; a similar U-shaped annular member fitting over the same; flexible annular sheets clamped at their outer edges to one of said annular members and at their inner edges to a fixed part of the wheel; lipped flanges projecting from one of said members; a plurality of members wound over one of the edges of each of said sheets to retain it in position upon said lipped flange; a clamping ring for securing the other edge of each of said sheets to a fixed part of the wheel; and means for forcing compressed air into the space formed by said annular members and sheets.

6. In combination with a wheel, the combination of a U-shaped annular member secured to the felly thereof; a U-shaped annular member fitted over the other; filling rings between the side walls of said members; flexible sheets secured to and connecting the outer faces of one of said members with a fixed part of the wheel; means connecting said members to cause them to rotate in unison; and means for forcing compressed air into the chamber formed by said members and sheets.

7. In combination with a wheel, a U-shaped annular member secured to the felly thereof; a similar U-shaped annular member fitting over the same; flexible annular sheets clamped at their outer edges to one of said annular members and at their inner edges to a fixed part of the wheel; means for forcing compressed air into the space formed by said annular members and sheets; a plurality of projections extending inwardly from the outer annular member; a plurality of projections extending outwardly from the inner annular member; and a flexible connector secured to said projections and fixedly secured therein.

Signed by me at 4 Post Office Sq., Boston, Mass., this 30th day of August, 1909.

HENRY EDWARD MOEBUS.

Witnesses:
    WALTER E. LOMBARD,
    NATHAN C. LOMBARD.